No. 720,734. PATENTED FEB. 17, 1903.
D. O. PAIGE.
FLANGING MACHINE.
APPLICATION FILED MAR. 10, 1902.
NO MODEL. 9 SHEETS—SHEET 3.
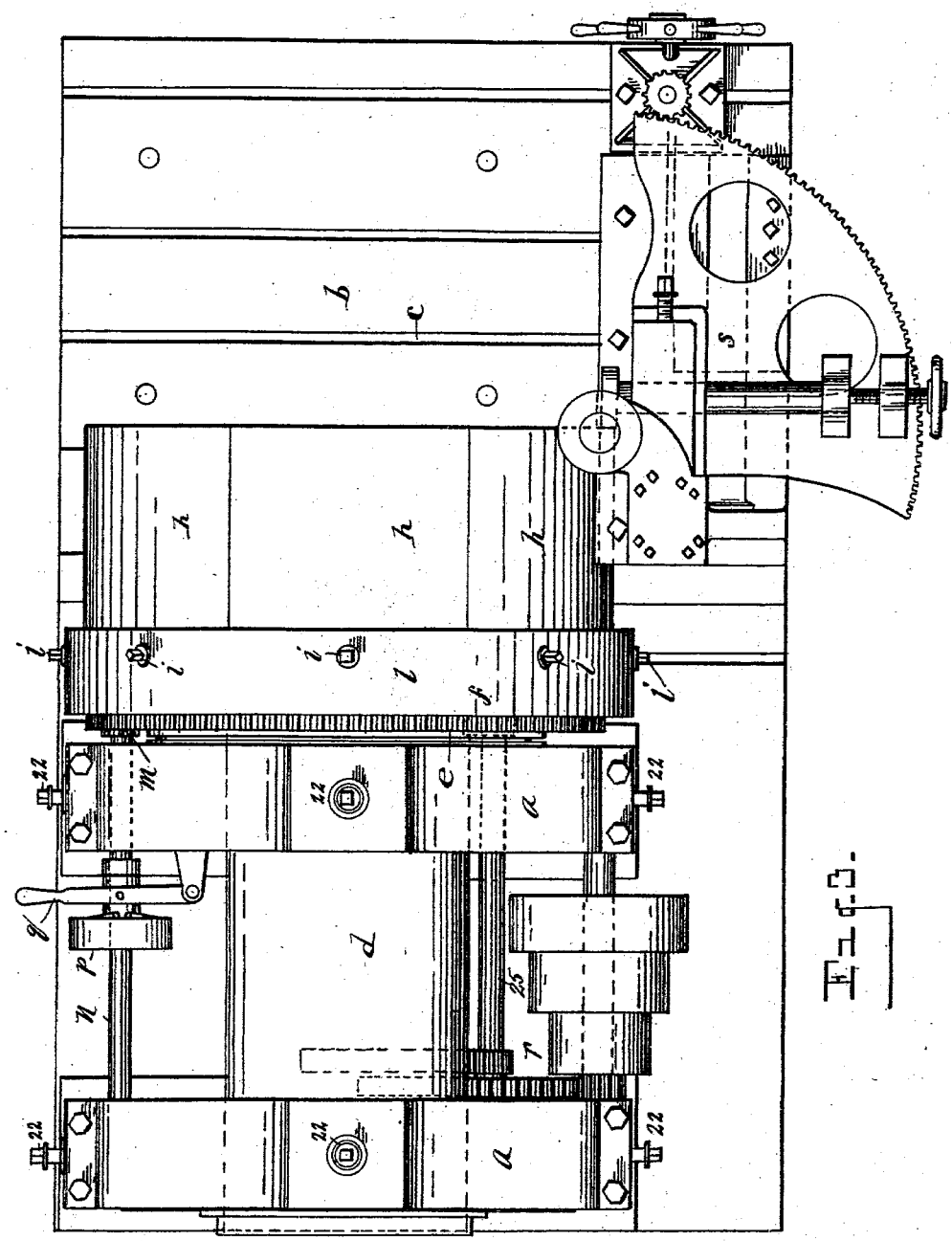

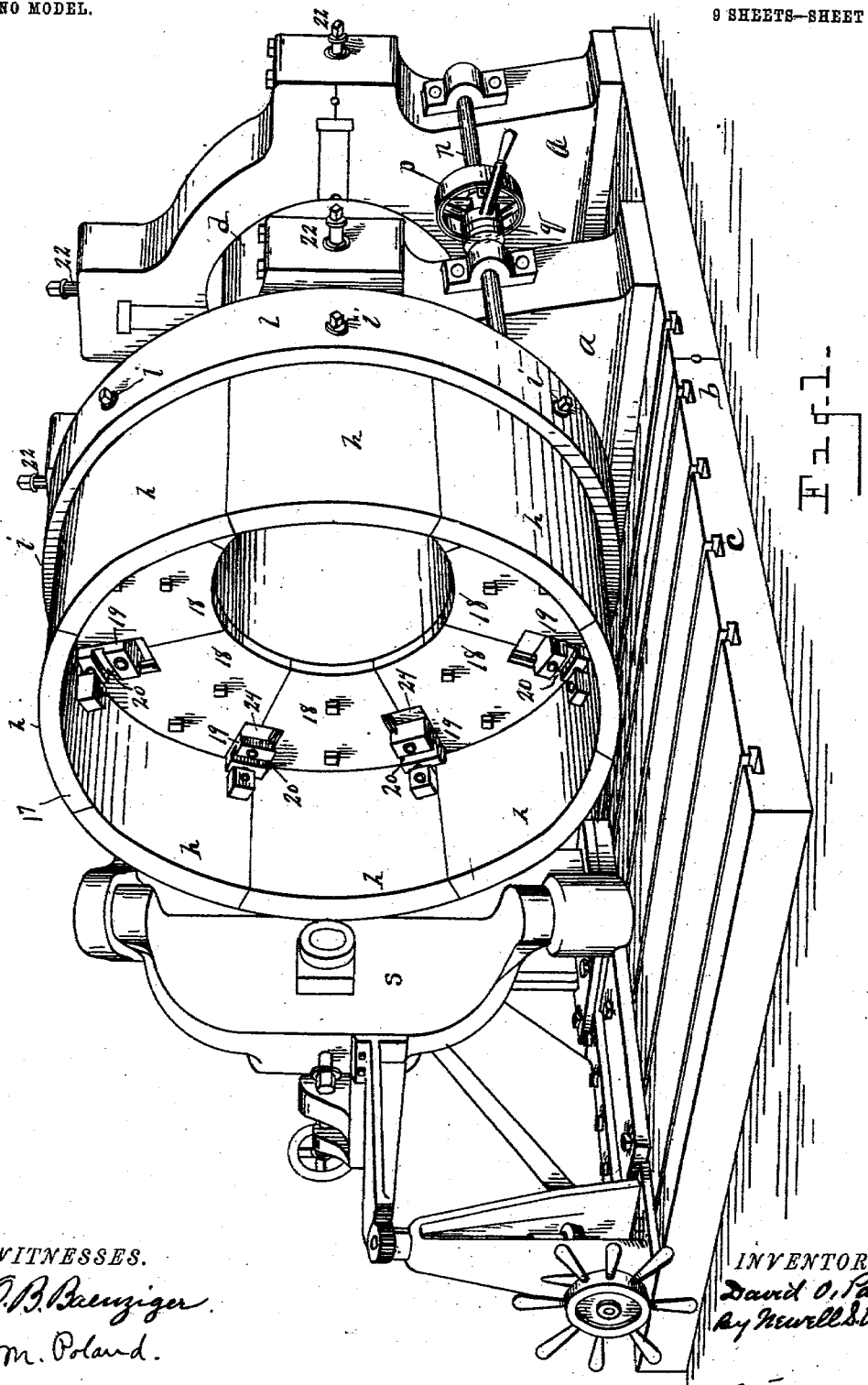

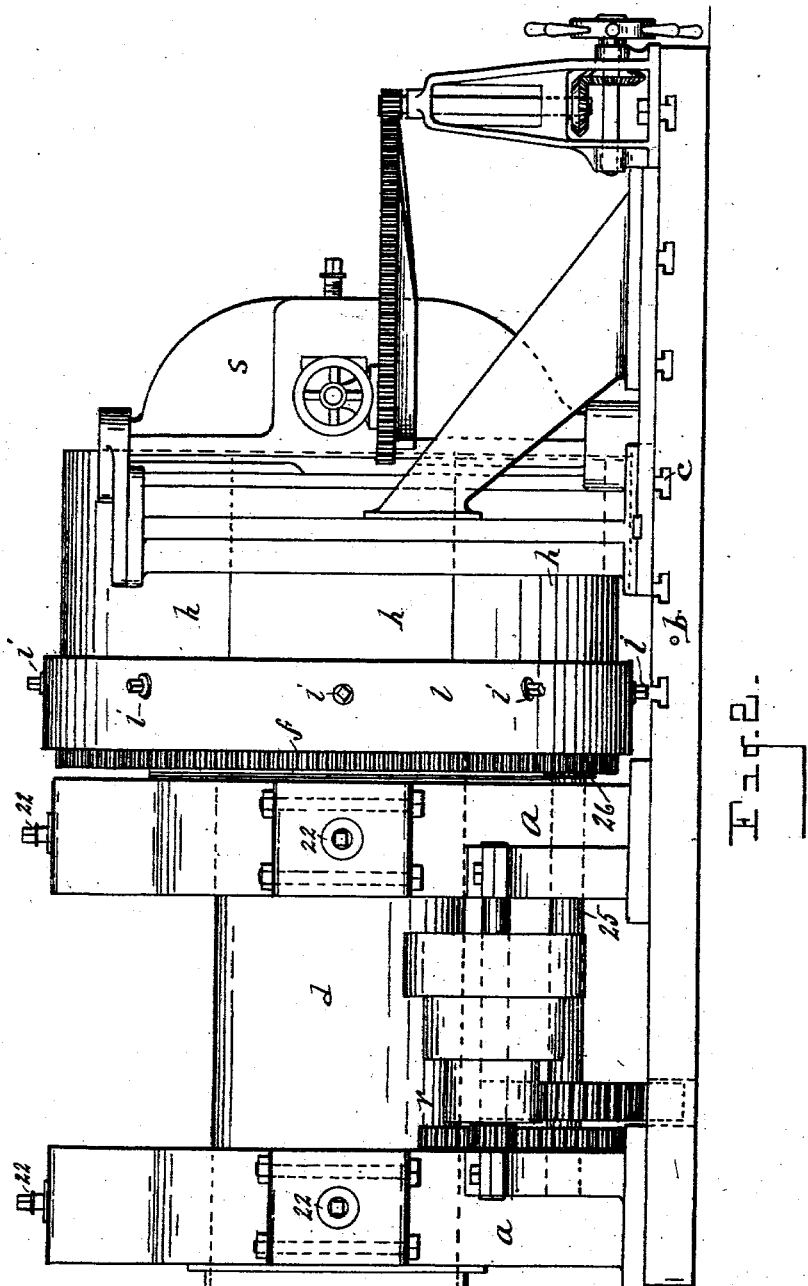

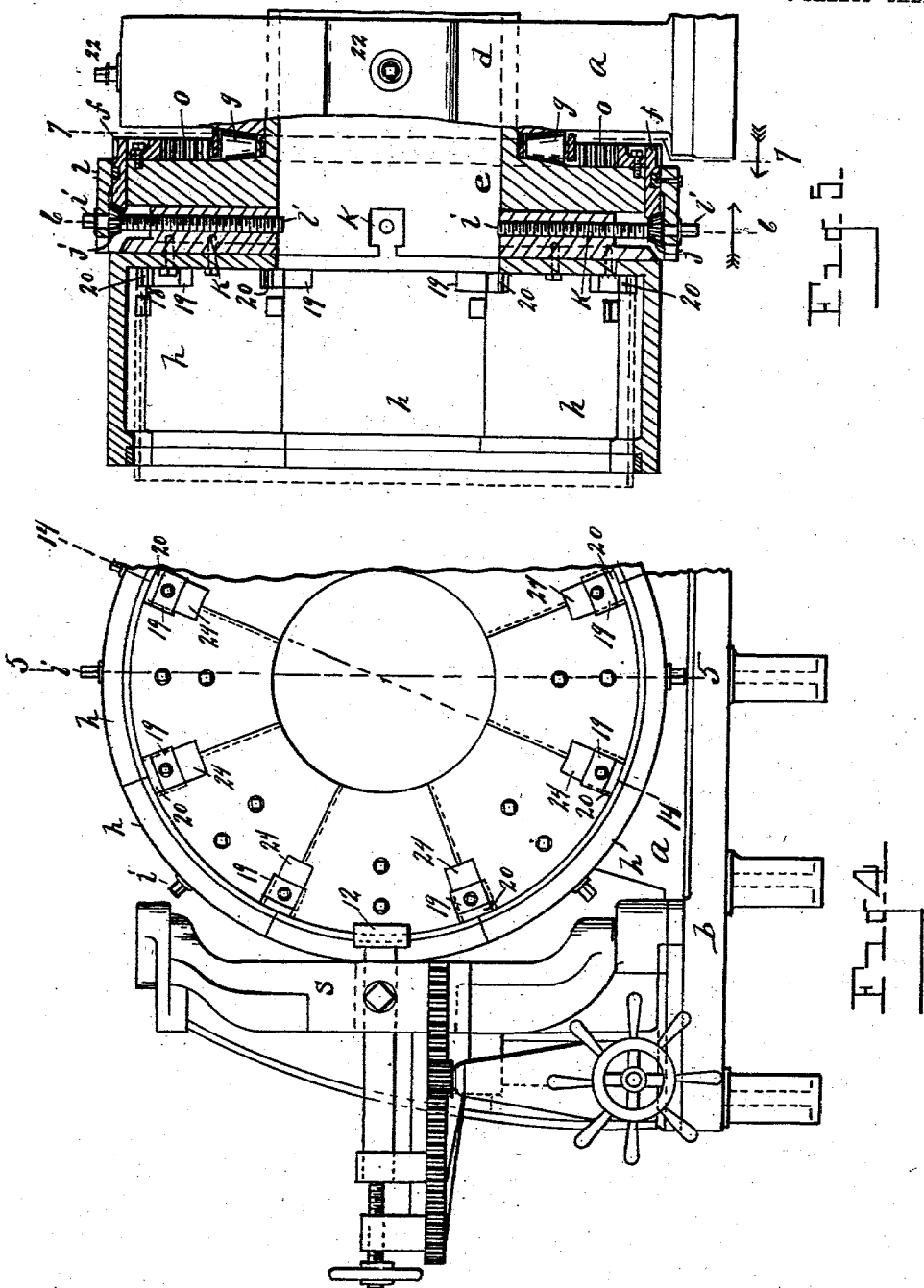

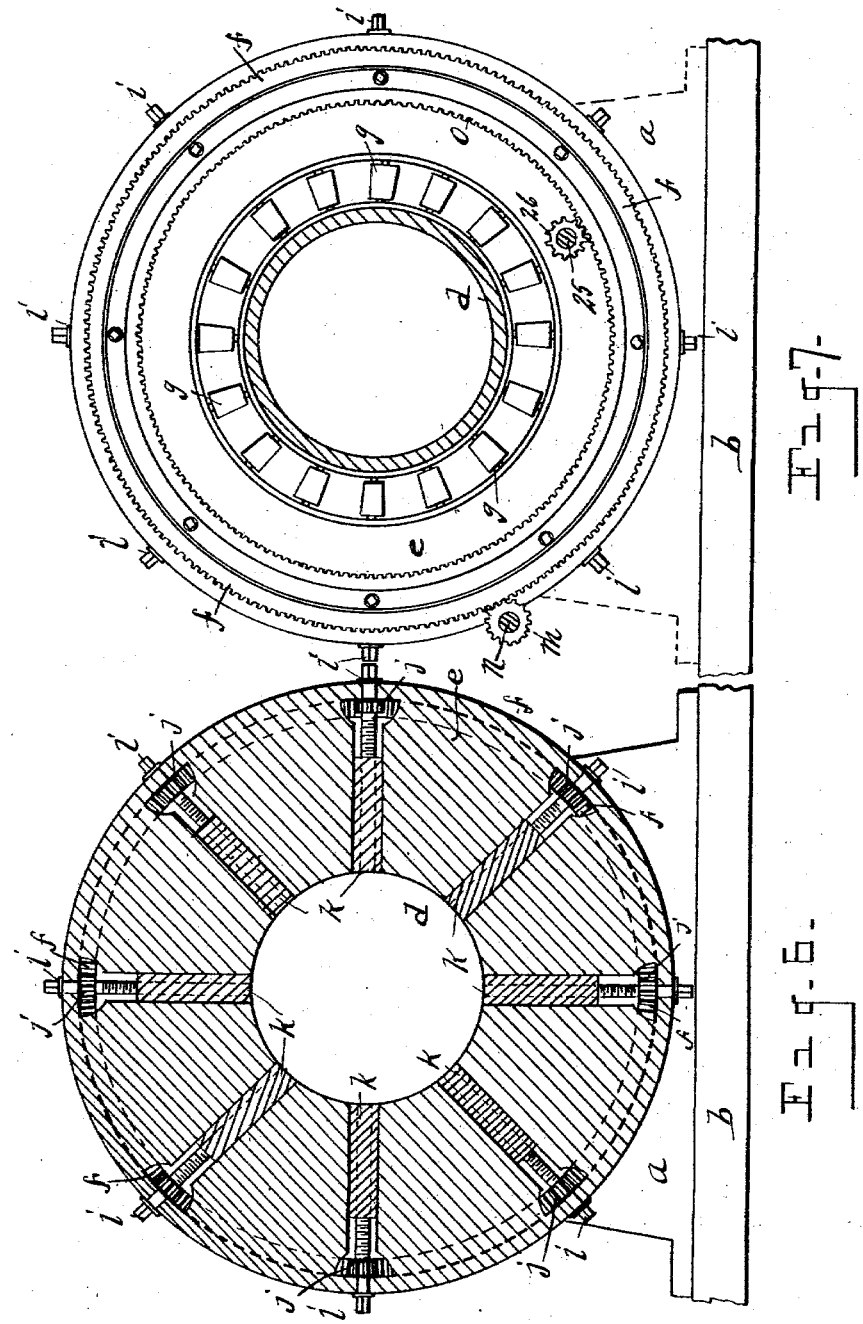

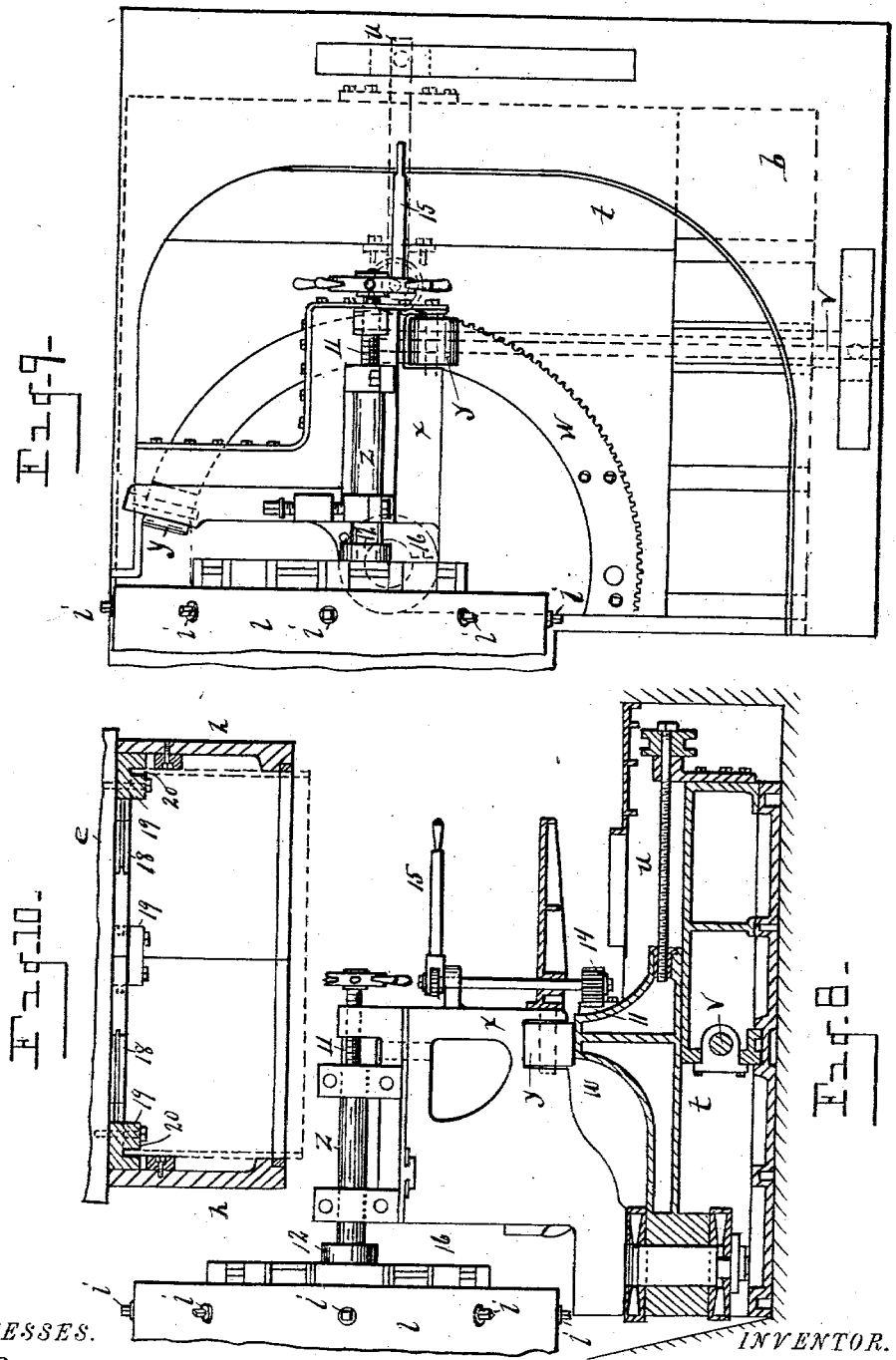

No. 720,734. PATENTED FEB. 17, 1903.
D. O. PAIGE.
PLANGING MACHINE.
APPLICATION FILED MAR. 10, 1902.
NO MODEL. 9 SHEETS—SHEET 7.
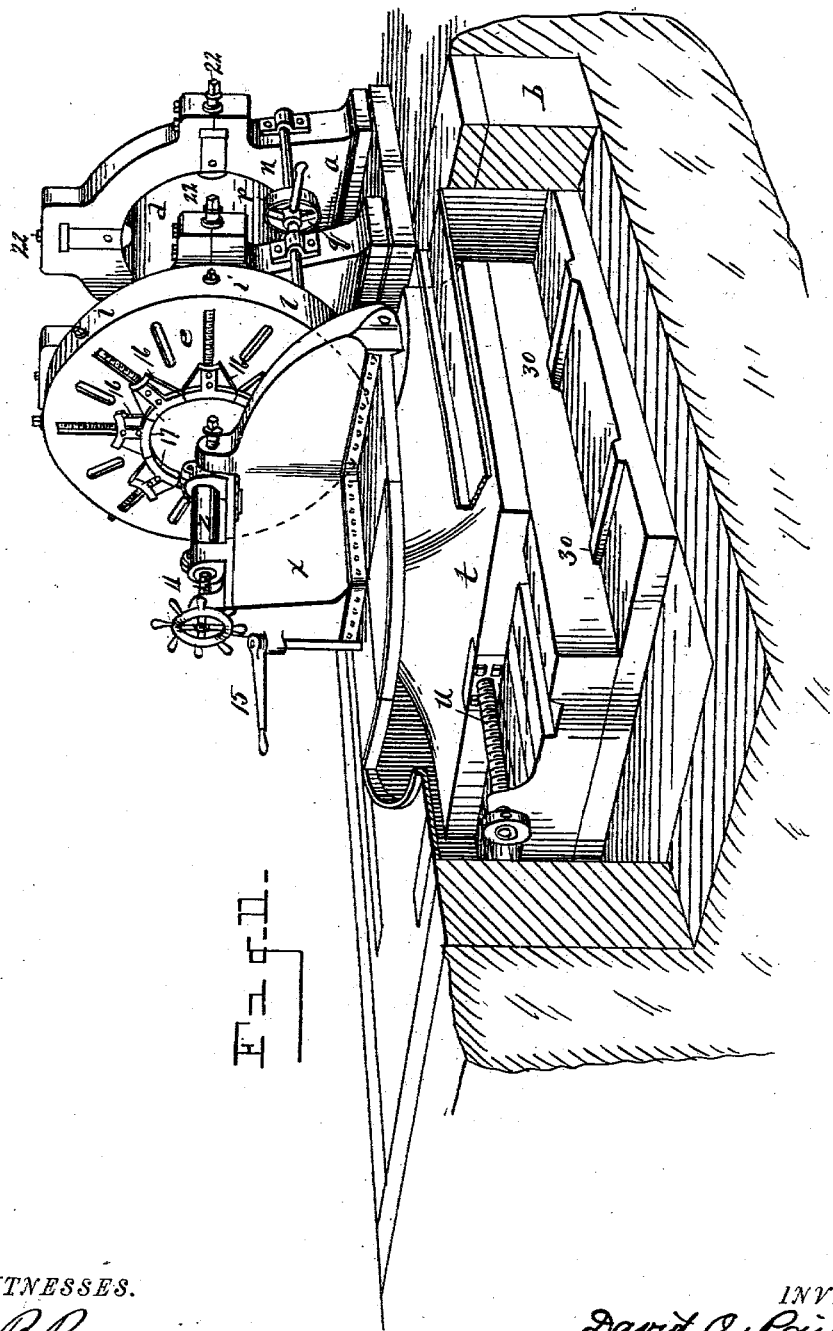
WITNESSES.
O. B. Baenziger
J. M. Poland
INVENTOR.
David O. Paige
By Newell S. Wright
His Attorney

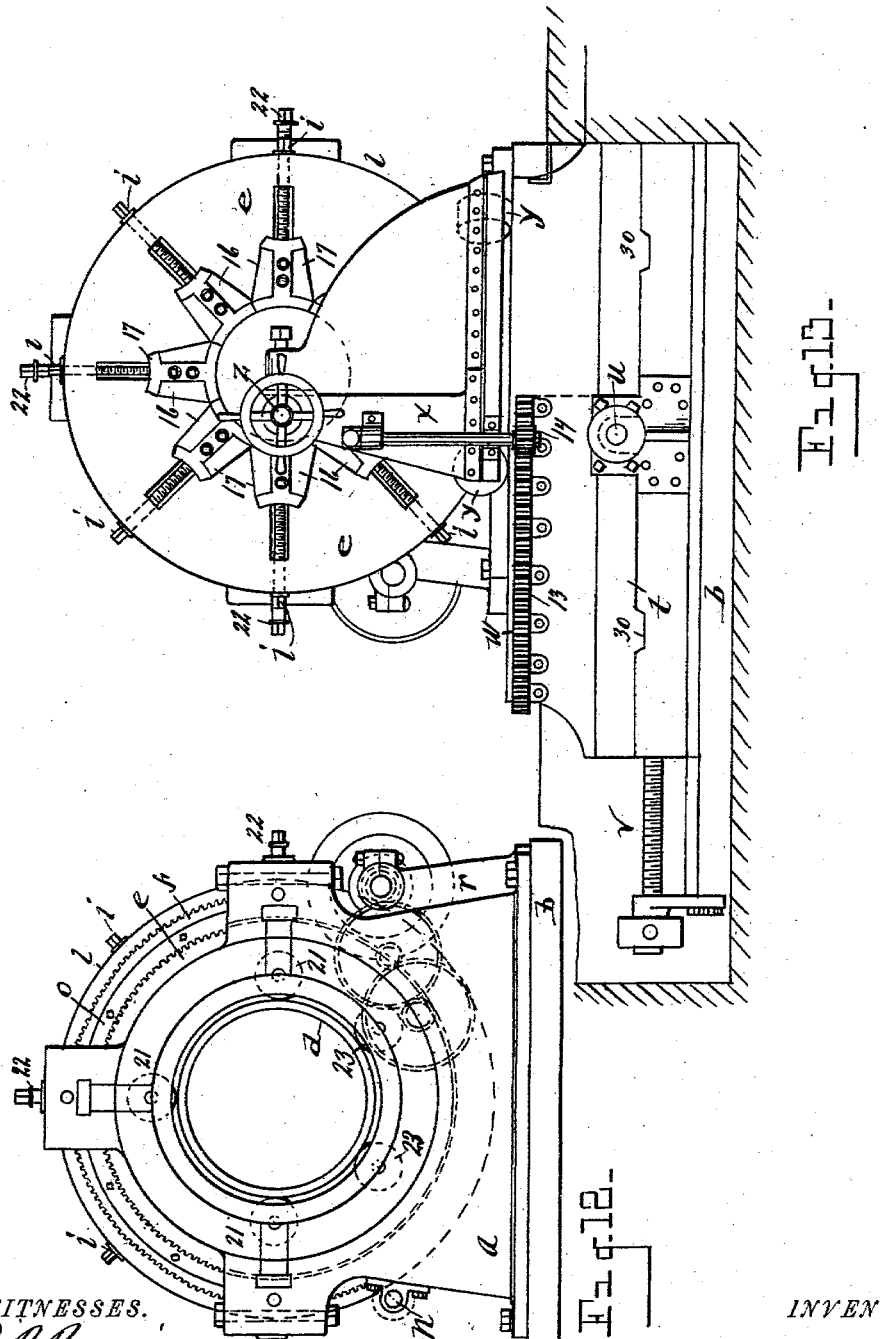

No. 720,734. PATENTED FEB. 17, 1903.
D. O. PAIGE.
FLANGING MACHINE.
APPLICATION FILED MAR. 10, 1902.
NO MODEL. 9 SHEETS—SHEET 9.
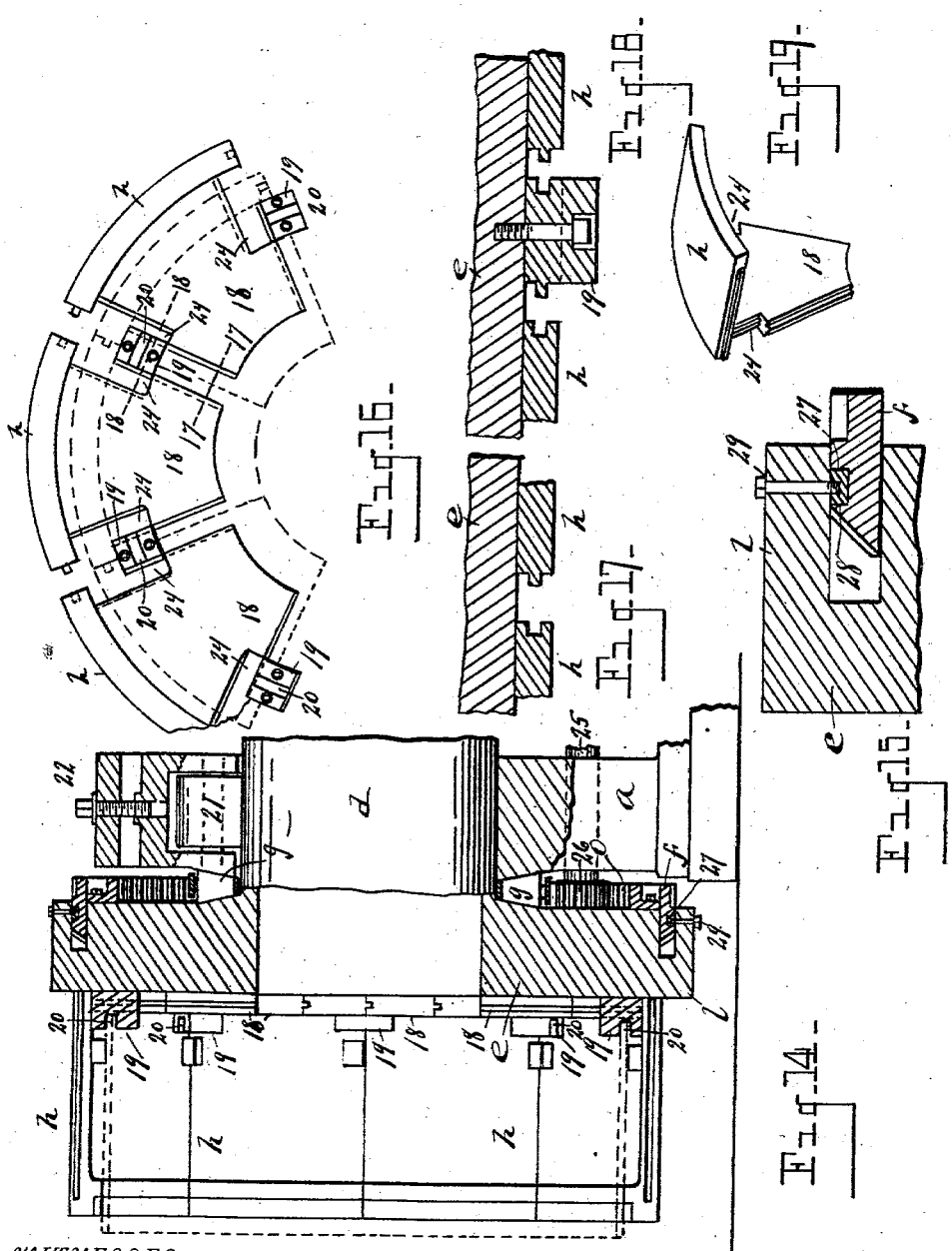
WITNESSES.
O. B. Baenziger.
J. M. Poland.
INVENTOR.
David O. Paige
By Newell S. Wright
His Attorney

UNITED STATES PATENT OFFICE.

DAVID O. PAIGE, OF DETROIT, MICHIGAN.

FLANGING-MACHINE.

SPECIFICATION forming part of Letters Patent No. 720,734, dated February 17, 1903.

Application filed March 10, 1902. Serial No. 97,653. (No model.)

*To all whom it may concern:*

Be it known that I, DAVID O. PAIGE, a citizen of the United States, residing at Detroit, county of Wayne, State of Michigan, have invented a certain new and useful Improvement in Flanging-Machines; and I declare the following to be a full, clear, and exact description of the invention, such as will enable others skilled in the art to which it appertains to make and use the same, reference being had to the accompanying drawings, which form a part of this specification.

The object of my invention is to provide an improved flanging-machine of superior efficiency and utility; and it consists of the construction, combination, and arrangement of parts hereinafter described and claimed, and illustrated in the accompanying drawings, in which—

Figure 1 is a perspective view of the machine. Fig. 2 is a view in side elevation. Fig. 3 is a plan view. Fig. 4 is a view in front elevation. Fig. 5 is a view in section on line 5 5, Fig. 4. Fig. 6 is a view in section on line 6 6, Fig. 5. Fig. 7 is a view in section on line 7 7, Fig. 5. Fig. 8 is a view in section, showing a modified form of the flanging-roll and related mechanism. Fig. 9 is a plan view of the mechanism illustrated in Fig. 8. Fig. 10 is a view in horizontal section through the chuck for flanging cylindrical bands. Fig. 11 is a view in perspective, showing the machine adapted for flanging pipe. Fig. 12 is a view in rear elevation. Fig. 13 is a view in elevation from the opposite end, showing the mechanism arranged for flanging pipe. Fig. 14 is a view in section on the line 14 14, Fig. 4. Fig. 15 is a detail view in section, showing how the toothed rim $f$ is held in place. Fig. 16 is a detail view in elevation, showing the segments $h$ in open position. Fig. 17 is a view in section on the line 17 17, Fig. 16. Fig. 18 is a view in section on the line 18 18, Fig. 16. Fig. 19 is a detail view of one of the segments $h$ and its flanged head.

More particularly it is the object of my invention to provide an improved hollow-spindle-flanging machine for turning flanges on metal pipe of various sizes—as upon steel pipe, for example—of any desired length and upon cylindrical bands of large diameter—as, for example, cylindrical bands such as are employed in the construction of large metal tanks commonly employed in brewing beer, and for other or analogous purposes.

It is obvious that a machine capable of being used for flanging metal pipes and cylindrical bands varying from pipes of small diameter to bands for tanks of large diameter and by which they may be flanged either cold or when heated possesses superior efficiency and merit.

I carry out my invention as follows:

In the drawings, $a$ represents any suitable frame, and $b$ any suitable supporting-bed, a portion of which is shown constructed with parallel transverse T-shaped slots $c$. A hollow spindle or shaft $d$ is shown journaled in said frame, the same having a head or face-plate $e$, provided with a toothed rim on its periphery, as shown at $f$. Between said head and the adjacent portion of the frame are roller or analogous bearings $g$. When a cylindrical ring or band of large diameter is to be flanged, the machine is provided with a chuck formed with a series of adjustable segments or sections $h$, constructed to be opened or separated outward from the center to receive the ring to be flanged and to be closed firmly thereupon to hold the ring in place in flanging the same. This chuck is constructed in the nature of a combination or universal chuck, with certain modifications. The various segments of the chuck are each provided with a screw $i$, having a pinion $j$ meshing with the toothed rim $f$ of said head, each screw having a threaded connection with the corresponding segment, as in a shoulder or bracket-arm $k$, and extending through an outer band or shell $l$, covering the pinions and the adjacent portion of the toothed rim $f$ of the head $e$, whereby the screw may be actuated by a hand-wrench, if desired. The toothed rim of said head is also extended laterally to mesh with a pinion $m$ upon a counter-shaft $n$ for opening and closing the segments of the clutch by power when desired, said shaft provided with any suitable driving mechanism, as a pulley $p$, said shaft also being provided with clutch mechanism (indicated at $q$) for throwing the shaft into and out of operation. The hollow spindle and chuck are rotated, with the work engaged within the chuck, by any suitable driving mechanism, $r$ denoting certain features of mechanism adapted for the purpose, provided with a driving-shaft 25 and pinion 26, geared with a toothed flange $o$ upon the head $e$.

An upright crane carrying a flanging-roll is shown in Figs. 1, 2, 3, and 4, said crane adapted to be revolved horizontally about its axis, the crane and its actuating mechanism so shown being essentially that embodied in United States Letters Patent No. 425,453, granted to me April 15, 1890, and need no further description here. I do not, however, limit myself to the employment of the upright crane embodied in said patent to support the flanging-roll.

In Figs. 8, 9, 11, and 13 I have shown a modification in the flanging-roll mechanism as applied to the machine, the same being provided with any suitable bed $t$, made adjustable toward and from the work, as by an adjusting-screw $u$, an underlying base being also laterally adjustable, as by an adjusting-screw $v$. The bed $t$ is provided with a segmental track $w$, supporting a framework $x$, supported upon said track preferably upon rollers $y$, said frame thus made oscillatory upon said track. The frame $x$ carries a shaft $z$, actuated by an adjusting-screw 11, provided with a flanging-roll 12. The frame $x$ is made oscillatory upon the track $w$ in any suitable manner. As shown, said track is provided with a rack 13, with which meshes a pinion 14, with the shaft of which may be engaged an operating-lever 15.

When it is desired to flange metal pipe, the pipe is located in the hollow spindle $d$ or run therethrough from the rear end thereto, the screws $i$ of the chuck instead of being engaged with segments $h$ being engaged at the inner ends with segmental jaws 16, arranged about the periphery of the hollow spindle at its inner end. These segmental jaws are preferably made reversible, their opposite extremities being of different sizes, so that by reversing the jaws a smaller or larger clutch may be provided to engage and hold the pipe, said jaws also constructed to form a flanging anvil or face.

When the machine is employed for flanging pipe, the segments $h$ are removed and the jaws 16 are engaged with the screws $i$. The jaws or segments 16 when employed are provided with an anvil-face 17. The outer edges of the segments $h$ also constitute an anvil-face. It is desirable that the segments $h$ and the jaws or segments 16 contact at their adjacent edges when in closed position to furnish a complete circular anvil-face for the turning of the flange thereupon. The extremities of the jaws or segments 16 are also preferably constructed on arcs of different radii to grasp pipes of different diameters.

For flanging cylindrical bands the head $e$ of the chuck is provided with blocks 19, provided with recesses 20, said recesses being designed to receive the inner unflanged end of the band, said blocks also forming a bearing for the turned flange when the ring is reversed in order to have a flange turned upon its outer end, the blocks permitting the ring or band to be so held in position that the end of the ring will project out from the anvil-face of the chuck, so that the other flange may be turned thereupon. The rim $f$ is constructed to be rotated independently of the head $e$ to actuate the screws $i$ to expand and contract the segments $h$ or jaws 16, as the case may be. It will be understood that the driving mechanism will be stopped when the segments or jaws of the chuck are to be opened or closed and that when the the driving mechanism is running the counter-shaft $n$ is running idle. The frame of the machine is preferably provided with roller-bearings 21 (indicated in Figs. 12 and 14) to facilitate the rotation of the hollow spindle, said bearings being adjustable, as by adjusting-screws 22. Other roller-bearings may be provided beneath the hollow spindle, if desired, as indicated at 23. I do not limit myself as to certain features of my invention to a hollow spindle.

The operation of the machine will now be understood. When a cylindrical ring or band is to be flanged, the segments $h$ will be expanded to receive the ring, said segments being closed firmly upon the ring when in place to hold it in position. Obviously the provision of means for actuating said segments by mechanical power will very greatly facilitate the rapidity with which the operation of locating the ring in place and its reversal or removal may be effected. Essentially the same is true also when the machine is employed for flanging pipe. When the work is in place, the flanging-roll is brought into proper position and operation, while the chuck is also set in motion. In the process of turning the flange the flanging-roll will be adjusted relative to the work as may be required. It will be understood that the blocks 19 are stationary upon the head $e$.

The segments $h$ are shown constructed with a flanged head 18, projecting outward from the base of the segments at essentially a right angle thereto, provided with suitable recesses or openings 24 to permit the blocks 19 to project therethrough. I prefer that the adjacent portions of the segments $h$, with their heads 18 and blocks 19, should close together with a tongue-and-groove connection, as shown particularly in detail in Figs. 17 and 18. This connection will afford greater rigidity to the structure when the parts are closed together. The rim $f$ may be held in place in any suitable manner. As shown, the rim is shown provided on its face with a recess 27, in which is engaged a ring 28, with which is engaged a screw 29, passed through the shell or casing $l$. Said casing may be held in engagement with the head $e$ of the chuck in any suitable manner. As shown, the shell $l$ is formed integral with the head $e$.

Instead of forming the bed $b$ with T-shaped slots c the bed of the flanging device may be adjusted thereupon in any suitable manner. As shown in Figs. 11 and 13, a tongue-and-groove connection of the one with the other is indicated at 30.

What I claim as my invention is—

1. In a flanging-machine the combination of an expansible chuck provided with segmental devices to hold the work, each provided with a radially-extending screw, a pinion on the outer end of said screw, mechanism geared with said pinion to open and close said devices, and mechanical means to actuate said mechanism.

2. In a flanging-machine the combination of an expansible chuck to hold the work, driving mechanism to rotate the chuck, and additional driving mechanism to open and close the chuck.

3. In a flanging-machine the combination of a rotatable spindle provided with a head, an expansible chuck to hold the work, carried by said head, and a flanging device, said chuck formed with an anvil-surface.

4. In a flanging-machine the combination of a hollow rotatable spindle provided with a head, an expansible chuck to hold the work, carried by said head, and a flanging device, said chuck provided with segmental devices formed with anvil-surfaces.

5. In a flanging-machine the combination of a rotatable spindle provided with a head, a chuck to hold the work, carried by said head, screws to expand and contract the chuck, gearing to actuate said screws, and additional mechanical means to actuate said gearing.

6. In a flanging-machine the combination of a spindle provided with a head, an expansible chuck, a gear upon said head, screws driven by said gear to open and close the chuck, means to drive said gear, an additional gear to drive said spindle, and mechanism to drive said latter gear.

7. In a flanging-machine the combination of a rotatable spindle provided with a head, an expansible chuck carried by said head, screws to open and close the chuck each provided with a pinion, a rotatable gear meshing with said pinions, and mechanical means to drive said gear.

8. The combination with a rotatable spindle provided with a head of a chuck carried by said head provided with expansible segments or jaws to engage the work, screws to open and close the segments or jaws of the chuck each provided with a pinion, a toothed rim upon said head to drive said pinions, and means to drive said rim independently of the rotation of the head.

9. The combination with a rotatable spindle provided with a head of a chuck carried by said head provided with expansible segments or jaws to engage the work, screws to open and close the segments or jaws of the chuck each provided with a pinion, a toothed rim upon said head to drive said pinions, means to drive said rim, and a band over said rim, said screws extending through said band.

10. In a flanging-machine the combination of a rotatable spindle provided with a head, a chuck carried by said head constructed with segmental jaws, screws engaged with said head to open and close said jaws, and mechanical means for actuating said screws.

11. In a flanging-machine the combination of a hollow rotatable spindle, and an expansible chuck provided with reversible segmental jaws or segments, the opposite end of said jaws or segments constructed on arcs of different radii.

12. In a flanging-machine the combination with a hollow rotatable spindle provided with a head of an expansible chuck, carried by said head provided with reversible segmental jaws, said segmental jaws contacting at adjacent edges when closed.

13. In a flanging-machine the combination of a supporting-frame and a hollow rotatable spindle, a chuck to engage the work and adjustable roller-bearings upon which the spindle rotates.

14. In a flanging-machine the combination of a rotatable spindle provided with a head a chuck carried by said head, provided with expansible devices to engage the work, mechanical means to open and close said devices, a shaft geared with said mechanism, and a clutch for throwing said gear into and out of operation.

15. In a flanging-machine the combination of an expansible chuck provided with segmental devices to be opened and closed upon the work, mechanism to open and close said devices, and mechanical means to actuate said mechanism, said segmental devices each constructed with a flange projecting outwardly therefrom at essentially right angles thereto, said flanges of a width to receive the body of the work to be flanged, the outer edges of said flanges constituting an anvil-surface.

16. In a flanging-machine the combination of an expansible chuck provided with segmental devices to hold the work, each of said devices provided with a radially-extended screw, pinions on the outer ends of said screws, mechanism geared with said pinions to open and close said device, and mechanical means to actuate said mechanism.

17. In a flanging-machine the combination with a rotatable chuck to engage the work, a bed made adjustable toward and from the work and at right angles with the work, a segmental track upon said bed, a frame oscillatory upon said track, flanging mechanism carried by said frame, means to adjust the flanging mechanism toward and from the work, and means to oscillate said frame.

18. In a flanging-machine the combination with a rotatable chuck to engage the work, a bed, a frame oscillatory upon said bed, flanging mechanism provided with a flanging-roll carried by said frame, means to adjust the frame toward and from the work and at right angles thereto, and means to adjust the flanging-roll to bring the roll against the work.

19. In a flanging-machine the combination of a rotatable spindle, a chuck provided with segments to hold the work and means to open and close said segments said segments having a tongue-and-groove connection when closed.

20. In a flanging-machine the combination of a rotatable spindle provided with a head, a chuck provided with segments to hold the work, blocks engaged with said head to engage the work, and means to open and close said segments, said segments having a tongue-and-groove connection when closed.

21. In a flanging-machine the combination of a rotatable spindle provided with a head, a chuck provided with devices to hold the work, screws to open and close said devices, pinions upon said screws, a gear meshing with said pinions, and an outer band or shell over said pinions and the adjacent portion of said gear.

22. In a flanging-machine the combination of an expansible chuck provided with segmental devices to hold the work, each provided with a radially-extending screw, a pinion on the outer end of said screw, mechanism geared with said pinions to open and close said devices, and mechanical means to actuate said mechanism, said segmental devices contacting at their adjacent edges when closed.

In testimony whereof I sign this specification in the presence of two witnesses.

DAVID O. PAIGE.

Witnesses:
N. S. WRIGHT,
JAMES S. HILL.